United States Patent [19]
Kondoh

[11] Patent Number: 5,939,850
[45] Date of Patent: Aug. 17, 1999

[54] CIRCUIT FOR DRIVING POLYPHASE MOTOR

[75] Inventor: Shunichi Kondoh, Tokyo, Japan

[73] Assignees: Mitsubishi Denki Kabushiki Kaisha; Mitsubishi Electric Engineering Co., Ltd., both of Tokyo, Japan

[21] Appl. No.: 09/132,074

[22] Filed: Aug. 10, 1998

[30] Foreign Application Priority Data

Mar. 27, 1998 [JP] Japan .................................. 10-081488

[51] Int. Cl.⁶ ................................ H02H 7/08; H02P 6/24
[52] U.S. Cl. ...................... 318/254; 318/434; 318/500; 318/519; 388/903
[58] Field of Search .................................. 318/138, 254, 318/434, 439, 459, 471, 472, 494, 496, 500, 519; 388/903, 928.1, 934; 361/23, 24

[56] References Cited

U.S. PATENT DOCUMENTS

| | | |
|---|---|---|
| 4,641,066 | 2/1987 | Nagata et al. ............................ 318/254 |
| 5,374,880 | 12/1994 | Kondoh et al. . | |
| 5,491,622 | 2/1996 | Carosa ......................................... 363/56 |
| 5,761,375 | 6/1998 | Naito ........................................ 388/806 |
| 5,877,602 | 3/1999 | Knodoh et al. .......................... 318/254 |

*Primary Examiner*—Bentsu Ro
*Attorney, Agent, or Firm*—Oblon, Spivak, McClelland, Maier & Neustadt, P.C.

[57] ABSTRACT

A circuit for driving a three-phase brushless DC motor (301) includes a neutral point feedback circuit (201) which operates a three-phase output circuit (202) so that a neutral point potential ($V_C$) of the motor (301) is maintained at a predetermined potential, and a neutral point potential comparison circuit (500) which determines whether or not the neutral point potential ($V_C$) is between reference potentials ($V_{ref1}$, $V_{ref2}$). If the neutral point potential ($V_C$) is not between the reference potentials ($V_{ref1}$, $V_{ref2}$), a switch shutoff signal (SC) is activated to turn off a switch (106), so that a current ($I_C$) is not provided to the neutral point feedback circuit (201). Accordingly, the neutral point feedback circuit (201) stops flowing currents ($I_A$, $I_B$) to the three-phase output circuit (202) which in turn stops driving the motor (301). The circuit for driving the motor (301) is prevented from being broken down if a short circuit occurs in the motor (301).

17 Claims, 11 Drawing Sheets

F I G . 10
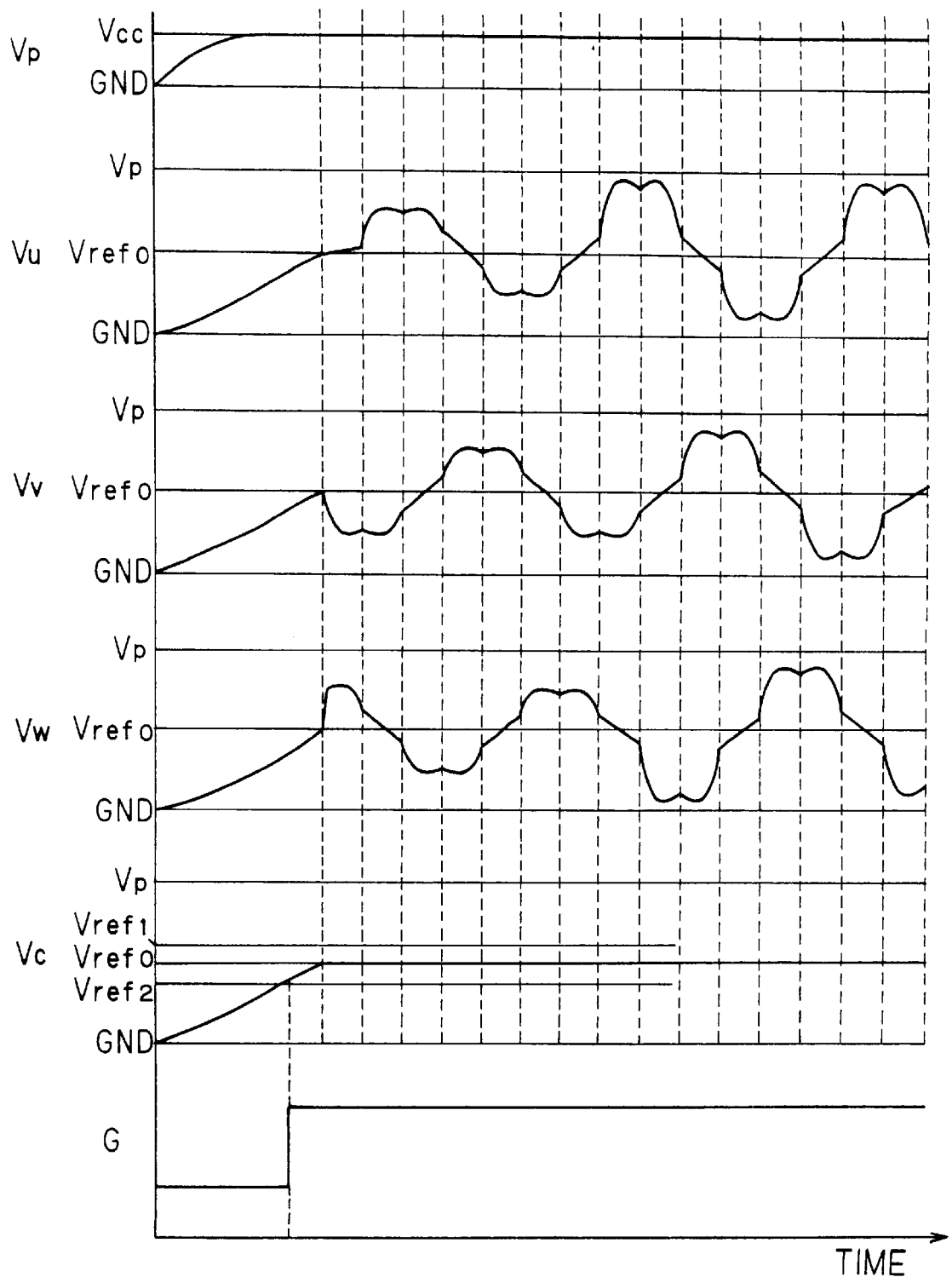

CIRCUIT FOR DRIVING POLYPHASE MOTOR

BACKGROUND OF THE INVENTION

1. Field of the Invention

The present invention relates to a technique for driving a brushless DC motor and, more particularly, to a technique for preventing the breakdown of a circuit for driving a motor if a short circuit occurs in the motor.

2. Description of the Background Art

A three-phase brushless DC motor, for example, is driven in response to three-phase current supplied thereto from a three-phase output circuit or drawn therefrom to the three-phase output circuit.

Unfortunately, if any exciting coil for one phase in the three-phase brushless DC motor is shorted to a ground potential or a power supply potential, the three-phase output circuit supplies an excessively greater amount of current than that during normal operation. This results in the thermal breakdown of the three-phase output circuit.

SUMMARY OF THE INVENTION

According to a first aspect of the present invention, a circuit for driving a polyphase motor comprises: a current source for supplying a first current; a switch operative to turn off in response to activation of a switch shutoff signal; a neutral point feedback circuit connected to the current source through the switch for performing a feedback operation for generating a second current based on the first current and a neutral point potential of a polyphase motor; a polyphase output circuit for supplying current selectively to a plurality of phases of the polyphase motor based on the second current and a first switching signal associated with the phases of the polyphase motor; and a neutral point potential comparison circuit for inactivating/activating the switch shutoff signal depending on whether or not the neutral point potential falls within a predetermined range.

Preferably, according to a second aspect of the present invention, in the circuit of the first aspect, the polyphase motor includes outputs for the phases, respectively, and the circuit further comprises: a plurality of resistors provided in corresponding relation to the outputs, and having first ends connected respectively to the outputs and second ends connected commonly, the neutral point potential being provided from the second ends of the plurality of resistors.

Preferably, according to a third aspect of the present invention, the circuit of the first or second aspect further comprises: a masking circuit for invalidating the switch shutoff signal in an early stage of rotation of the polyphase motor.

In accordance with the circuit for driving the polyphase motor of the first aspect of the present invention, the neutral point potential feedback circuit and the polyphase output circuit operate to drive the polyphase motor so that the neutral point potential is constant under normal operating conditions. The neutral point potential comparison circuit detects variations in the neutral point potential which are produced in the cases where one of the phases of the polyphase motor is shorted to a power supply or a short circuit occurs between the phases. Based on the detection, the switch stops supplying the first current to the neutral point feedback circuit which in turn stops supplying the second current to the polyphase output circuit. Then, the polyphase output circuit stops driving current to the polyphase motor. Therefore, if a trouble occurs in the polyphase motor, the circuit of the first aspect of the invention may promptly stop driving the polyphase motor to prevent the breakdown of the polyphase output circuit.

In accordance with the circuit for driving the polyphase motor of the second aspect of the present invention, the plurality of resistors may determine the neutral point potential from the potentials at the outputs of the polyphase motor. This eliminates the need for an interconnect line for drawing the neutral point potential from the polyphase motor in a different manner.

The circuit for driving the polyphase motor in accordance with the third aspect of the present invention is capable of driving the polyphase motor without turning off the switch in exceptional cases if the neutral point potential is out of the predetermined range in the early stage of the rotation of the polyphase motor and the switch shutoff signal is active. Therefore, the circuit of the third aspect of the invention may avoid malfunctions at the start of the polyphase motor.

It is therefore an object of the present invention to prevent the breakdown of a circuit for driving a polyphase motor if a short circuit occurs in the polyphase motor.

These and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a graph showing the operation of the third preferred embodiment of the present invention.

DESCRIPTION OF THE PREFERRED EMBODIMENTS

A. Precursory Concept of the Present Invention

Figure 1:
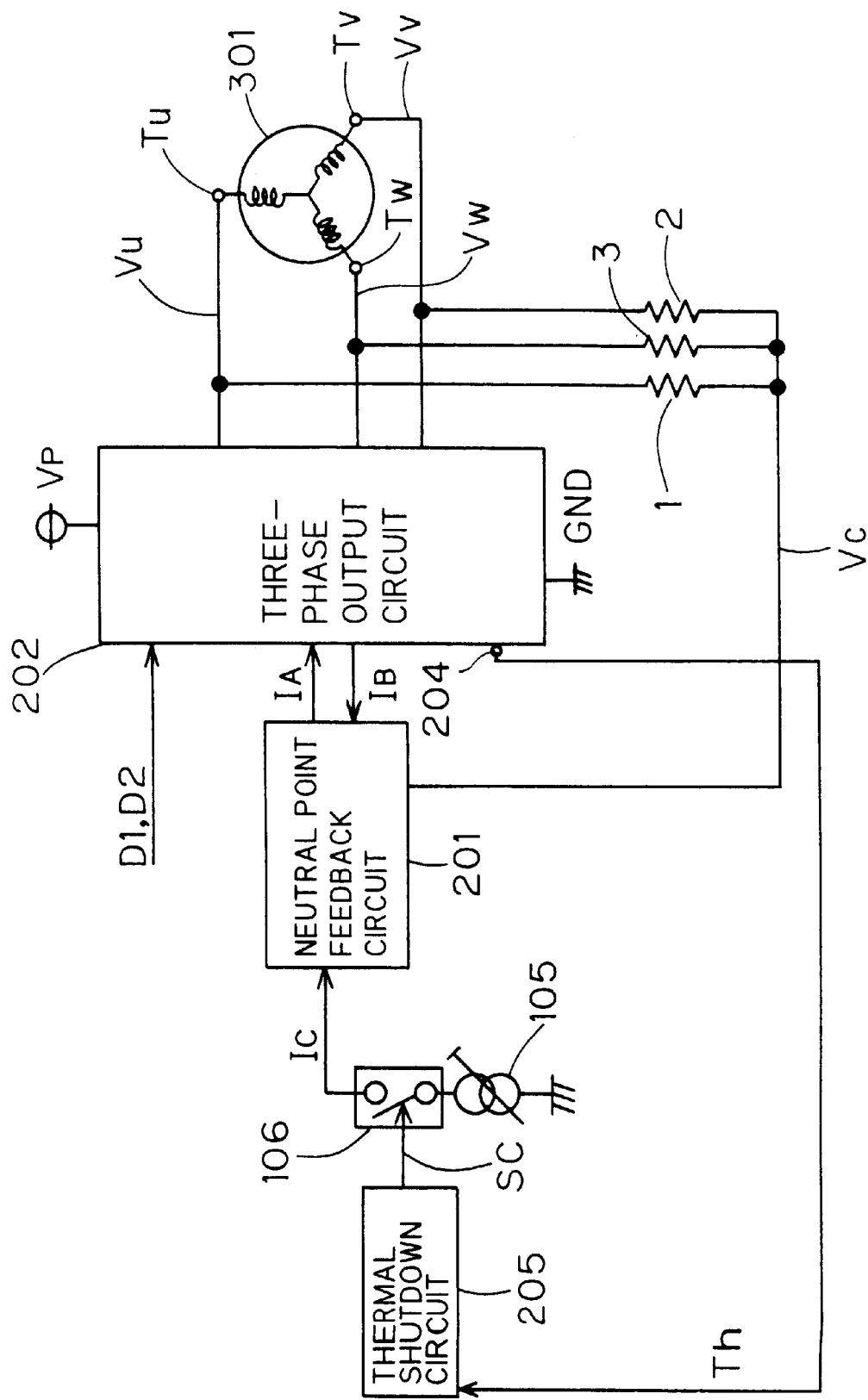
FIG. 1 is a circuit diagram showing a precursory concept of the present invention.

FIG. 1 is a circuit diagram showing a precursory concept of the present invention. A three-phase brushless DC motor 301 includes U-phase, V-phase, and W-phase exciting coils having respective inputs $T_u$, $T_v$ and $T_w$. A three-phase output circuit 202 supplies current to or draws current from the inputs $T_u$, $T_v$ and $T_w$ to develop potentials $V_u$, $V_v$ and $V_w$ at the inputs $T_u$, $T_v$ and $T_w$, respectively, using a ground potential as a reference. Which one of the U-phase, V-phase and W-phase exciting coils is to be subjected to the current supply or draw process by the three-phase output circuit 202 is controlled based on three-phase output switching signals D1 and D2. At this time, the current supplied from the three-phase output circuit 202 to the motor 301 or drawn from the motor 301 to the three-phase output circuit 202 is based on a current $I_A$ supplied from a neutral point feedback circuit 201 to the three-phase output circuit 202 and a current $I_B$ drawn from the three-phase output circuit 202 to the neutral point feedback circuit 201.

Resistors 1, 2 and 3 having an equal resistance have first ends receiving the potentials $V_u$, $V_v$ and $V_w$, respectively, and second ends connected commonly to develop neutral point potential $V_C$. The neutral point feedback circuit 201 generates the current $I_A$ and $I_B$ based on the neutral point potential $V_C$. Specifically, the neutral point feedback circuit 201 performs feedback control for operating the three-phase output circuit 202 so that the neutral point potential $V_C$ is maintained at a predetermined potential.

The currents $I_A$ and $I_B$ are based on a current $I_C$ supplied from a current source 105 to the neutral point feedback circuit 201 through a switch 106 which is normally on. In other words, the neutral point feedback circuit 201 amplifies (or attenuates) the current $I_C$ supplied from the current source 105 based on the neutral point potential $V_C$ to generate the currents $I_A$ and $I_B$, and the three-phase output circuit 202 then supplies current to or draws current from one of the U-phase, V-phase and W-phase exciting coils based on the currents $I_A$ and $I_B$ and the three-phase output switching signals D1 and D2.

The switch 106 is turned off in response to the activation of a switch shutoff signal SC. The switch shutoff signal SC used herein is high/low when it is active/inactive. The switch shutoff signal SC is activated by a thermal shutdown circuit 205 based on temperature information Th from a detector 204 for measuring the temperature of the three-phase output circuit 202.

With this arrangement, if a short-circuit trouble occurs in the three-phase brushless DC motor 301 to cause an abnormal increase in the temperature of the three-phase output circuit 202 up to a given set temperature, the switch 106 is turned off to preclude the current $I_C$ flowing. Then, the three-phase output circuit 202 causes no current to flow to the U-phase, V-phase and W-phase exciting coils, preventing the breakdown of the three-phase output circuit 202.

However, there is a likelihood that the breakdown of the three-phase output circuit 202 occurs before the increasing temperature of the three-phase output circuit 202 reaches the set temperature in the case of the short-circuit trouble. Thus, preferred embodiments of the present invention to be described hereinafter are adapted to detect a short-circuit trouble in the three-phase brushless DC motor 301 based on the neutral point potential rather than the temperature of the three-phase output circuit 202, thereby to turn off the switch 106.

B. First Preferred Embodiment

Figure 2:
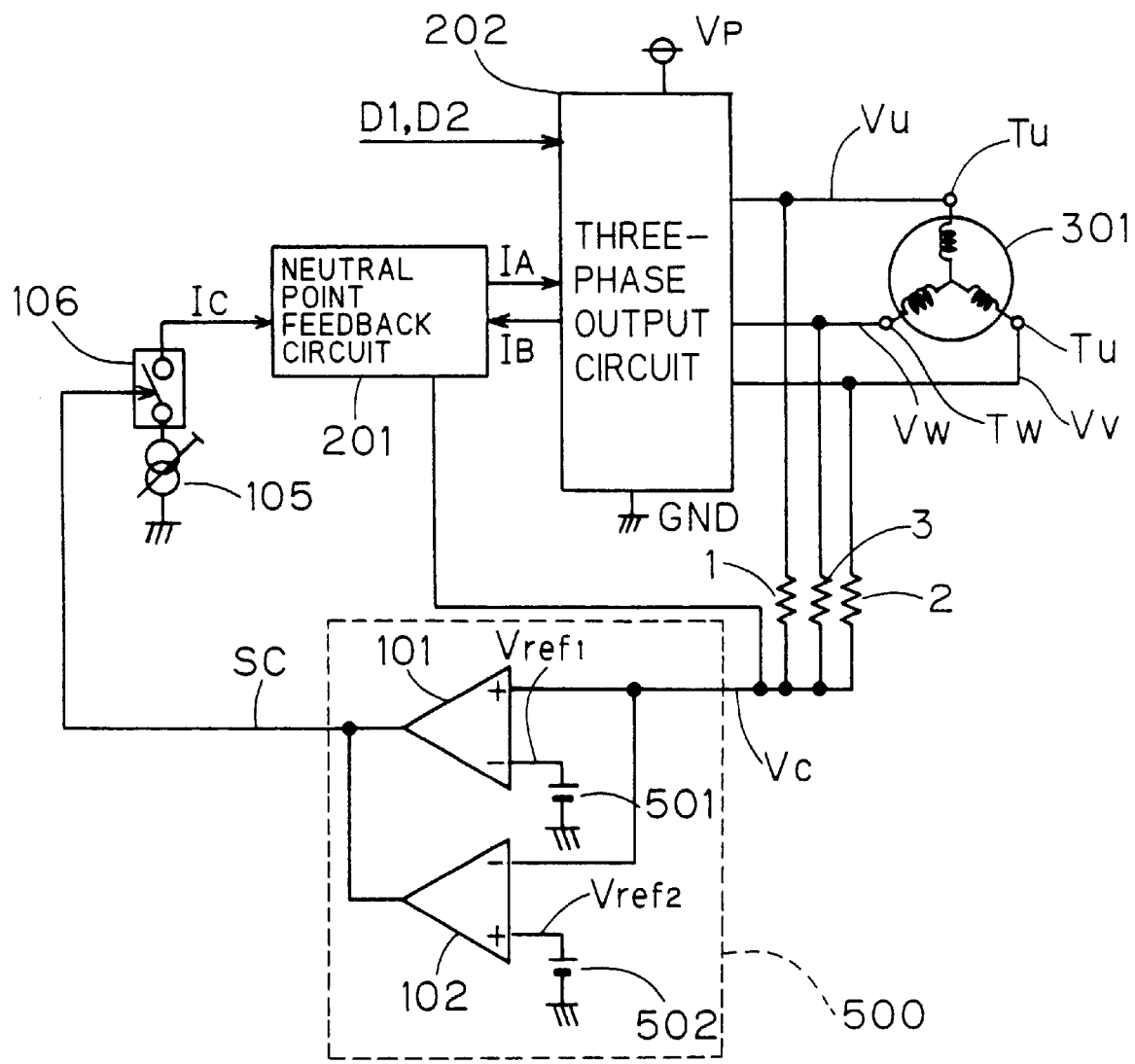
FIG. 2 is a circuit diagram of a first preferred embodiment of the present invention.

FIG. 2 is a circuit diagram of a first preferred embodiment according to the present invention. The structure of FIG. 2 differs from that of FIG. 1 in that a neutral point potential comparison circuit 500 is provided in place of the thermal shutdown circuit 205. The neutral point potential comparison circuit 500 outputs the switch shutoff signal SC which is active when the neutral point potential $V_C$ is greater than a reference potential $V_{ref1}$ or is less than a reference potential $V_{ref2}$ ($<V_{ref1}$).

The neutral point potential comparison circuit 500 comprises power supplies 501 and 502 for providing the reference potentials $V_{ref1}$ and $V_{ref2}$, respectively, and comparators 101 and 102. The neutral point potential $V_C$ is applied to a positive input of the comparator 101, and the reference potential $V_{ref1}$ is applied to a negative input thereof. The neutral point potential $V_C$ is applied to a positive input of the comparator 102, and the reference potential $V_{ref2}$ is applied to a negative input thereof. The respective outputs of the comparators 101 and 102 are commonly connected to output the switch shutoff signal SC.

Figure 3:
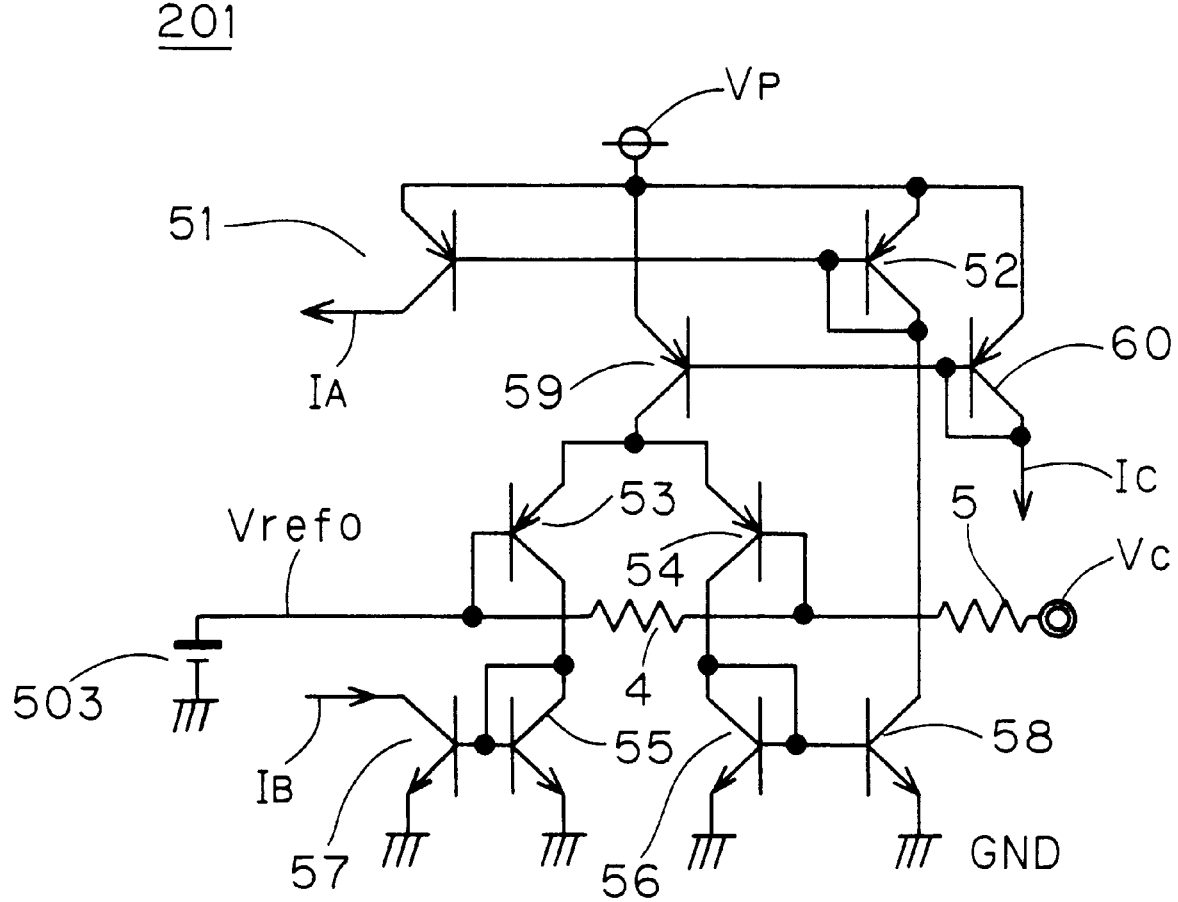
FIG. 3 is a circuit diagram of a neutral point feedback circuit.

FIG. 3 is a circuit diagram illustrating an arrangement of the neutral point feedback circuit 201. The neutral point feedback circuit 201 comprises PNP transistors 51 to 54, 59 and 60, NPN transistors 55 to 58, a power supply 503 for providing a reference potential $V_{ref0}$, and resistors 4 and 5. The transistors 53, 54 and 59 and the resistors 4 and 5 constitute a differential amplifier. Specifically, the base of the transistor 53 receives the reference potential $V_{ref0}$ and is connected to the base of the transistor 54 through the resistor 4. The neutral point potential $V_C$ is applied to a first end of the resistor 5, and a second end of the resistor 5 is connected to the base of the transistor 54. The emitters of the transistors 53 and 54 are commonly connected to the collector of the transistor 59. The gain of the differential amplifier is determined by a ratio between the resistance of the resistor 5 and the resistance of the resistor 4.

The transistor pair 59 and 60, the transistor pair 55 and 57, the transistor pair 56 and 58, and the transistor pair 51 and 52 constitute respective current mirror circuits. Specifically, the collector of the transistor 60 receives the current $I_C$ from the current source 105 through the switch 106, and a power supply potential $V_p$ is commonly applied to the emitter of the transistor 60 and the emitter of the transistor 59. Thus, the above-mentioned differential amplifier operates based on the current $I_C$. The reference potential $V_{ref0}$ is set to, for example, $V_p/2$.

The collector currents of the transistors 53 and 54 which increases and decreases based on the operation of the differential amplifier are outputted as the current $I_B$ by the transistors 55 and 57 and as the current $I_A$ by the transistors 56, 58, 52 and 51, respectively. The emitters of the transistors 51 and 52 commonly receive the power supply potential $V_p$, and the emitters of the transistors 55 to 58 are commonly grounded (receive a ground potential GND).

Figure 4:
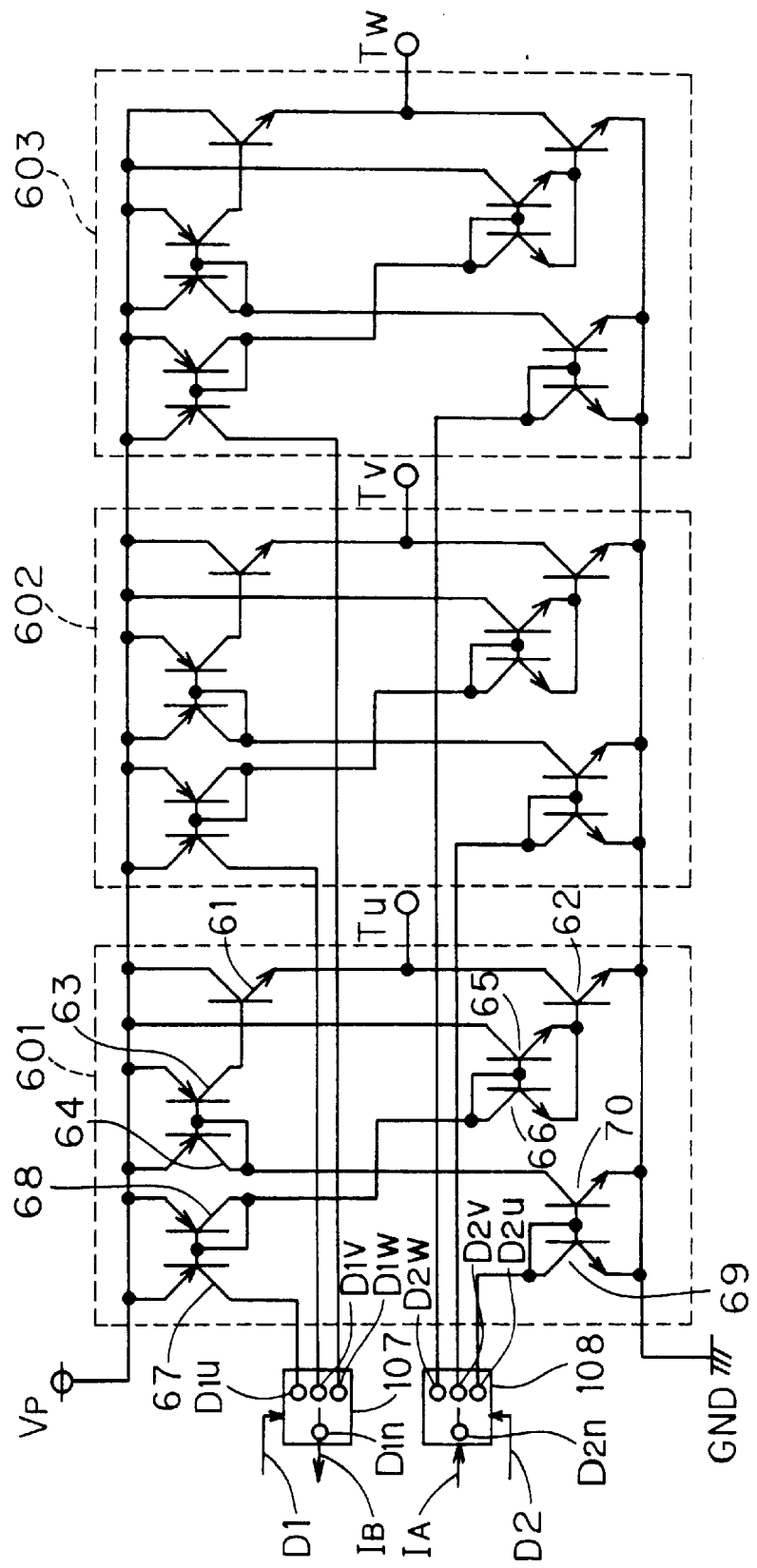
FIG. 4 is a circuit diagram of a three-phase output circuit.

FIG. 4 is a circuit diagram illustrating an arrangement of the three-phase output circuit 202. The three-phase output circuit 202 comprises portions 601, 602 and 603, and switches 107 and 108. The portions 601, 602 and 603 supply current to or draw current from the inputs $T_u$, $T_v$ and $T_w$ of the U-phase, V-phase and W-phase exciting coils, respectively. The portions 601, 602 and 603 are similar in construction. The switch 107 draws the current $I_B$ from one of the portions 601 to 603. The switch 108 supplies the current $I_A$ to one of the portions 601 to 603.

The switch 107 has a terminal $D_{1n}$ at which the current $I_B$ is drawn, and three terminals $D_{1u}$, $D_{1v}$ and $D_{1w}$ connected in an alternative manner to the terminal $D_{1n}$ based on the three-phase output switching signal D1. The switch 108 has a terminal $D_{2n}$ at which the current $I_A$ is supplied, and three terminals $D_{2u}$, $D_{2v}$ and $D_{2w}$ connected in an alternative manner to the terminal $D_{2n}$ based on the three-phase output switching signal D2.

The portion 601 comprises NPN transistors 61, 62, 65, 66, 69 and 70 and PNP transistors 63, 64, 67 and 68. The transistors 61 and 62 constitute a push-pull output stage. The transistor pair 63 and 64 and the transistor pair 69 and 70 constitute respective current mirror circuits, and cause a base current to flow through the transistor 61 based on the current $I_A$ if the terminal $D_{2u}$ of the switch 108 is connected to the terminal $D_{2n}$ thereof. Then, a current based on the current $I_A$ is supplied to the terminal $T_u$ in this case. The transistor pair 65 and 66 and the transistor pair 67 and 68 constitute respective current mirror circuits, and cause a base current to flow through the transistor 62 based on the current $I_B$ if the terminal $D_{1u}$ of the switch 107 is connected to the terminal $D_{1n}$ thereof. Then, a current based on the current $I_B$ is drawn from the terminal $T_u$ in this case. The collector of the transistor 61 and the emitters of the transistors 63, 64, 67 and 68 receive the power supply potential $V_p$, and the emitters of the transistors 62, 65, 66, 69 and 70 are grounded (receive the ground potential GND).

The relationship between the portion 602 and the switches 107 and 108 is similar to the relationship between the portion 601 and the switches 107 and 108. If the terminal $D_{2v}$ of the switch 108 is connected to the terminal $D_{2n}$ thereof, a current based on the current $I_A$ is supplied to the terminal $T_v$. If the terminal $D_{1v}$ of the switch 107 is connected to the terminal $D_{1n}$ thereof, a current based on the current $I_B$ is drawn from the terminal $T_v$. Furthermore, the relationship between the portion 603 and the switches 107 and 108 is also saimilar to the relationship between the portion 601 and the switches 107 and 108. If the terminal $D_{2w}$ of the switch 108 is connected to the terminal $D_{2n}$ thereof, a current based on the current $I_A$ is supplied to the terminal $T_w$. If the terminal $D_{1w}$ of the switch 107 is connected to the terminal $D_{1n}$ thereof, a current based on the current $I_B$ is drawn from the terminal $T_w$.

The neutral point feedback circuit 201 performs a negative feedback upon the current $I_B$ so that the neutral point potential $V_C$ is maintained at the reference potential $V_{ref0}$. For example, if the neutral point potential $V_C$ decreases, the current $I_A$ decreases and the current $I_B$ increases. For the portion 601, for example, the current supplied to the terminal $T_u$ decreases whereas the current drawn from the terminal $T_u$ increases, and the voltage excited by the U-phase exciting coil increases the neutral point potential $V_C$. Conversely, if the neutral point potential $V_C$ increases, the current $I_A$ increases and the current $I_B$ decreases. Then, the current supplied to the terminal $T_u$ (or the terminal $T_v$ or $T_w$) increases whereas the current drawn therefrom decreases, and the voltage excited by the U-phase exciting coil decreases the neutral point potential $V_C$.

Figure 5:
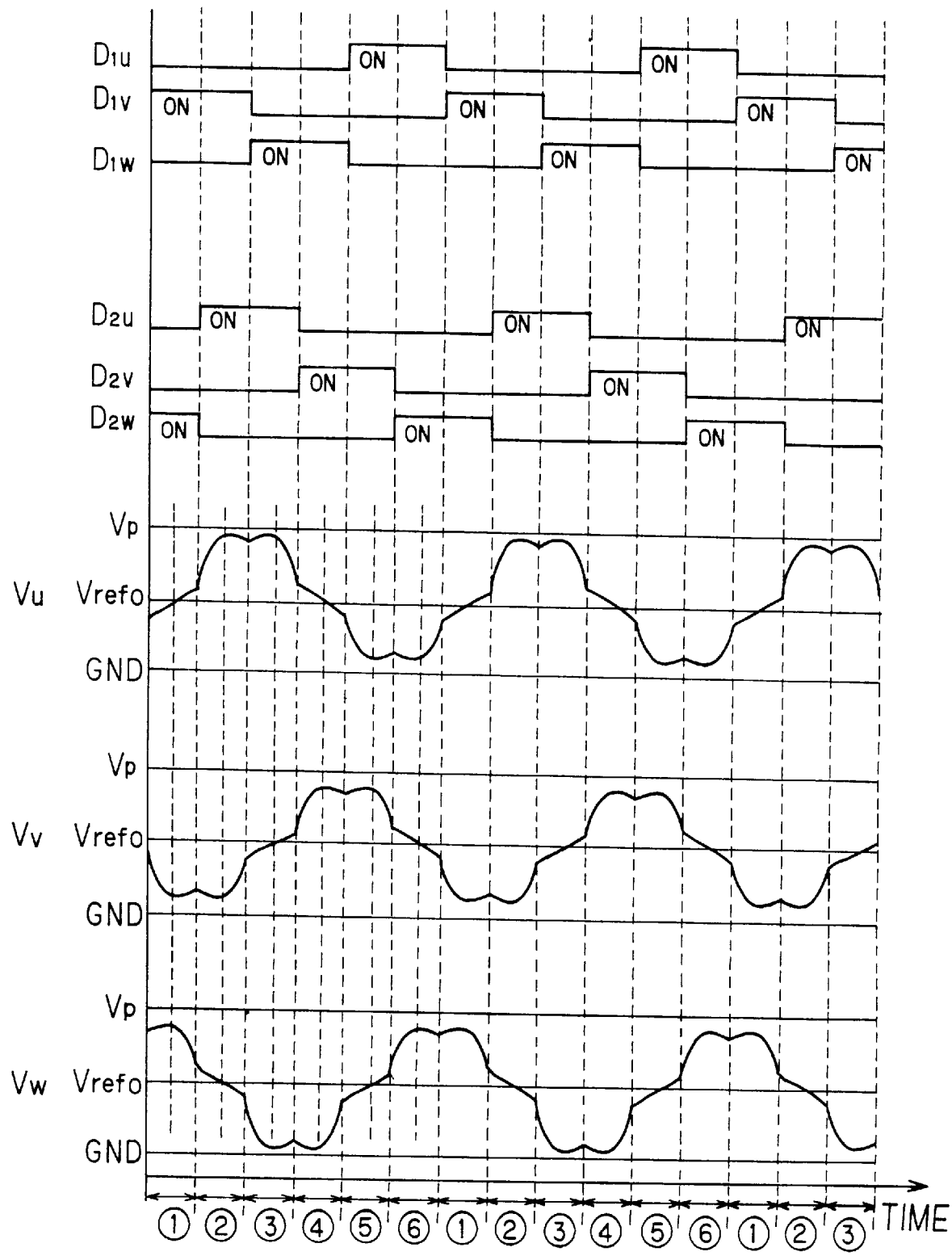
FIGS. 5 through 7 are graphs showing the operation of the first preferred embodiment of the present invention.

FIG. 5 is a graph showing the relationship between the switching of the switches 107 and 108 and the transitions of the potentials $V_u$, $V_v$ and $V_w$ under normal operating conditions. In the graph, the waveforms $D_{1u}$, $D_{1v}$ and $D_{1w}$ at the terminals $D_{1u}$, $D_{1v}$ and $D_{1w}$ when connected to the terminal $D_{1n}$ are shown as being in the "ON" state, and the waveforms $D_{2u}$, $D_{2v}$ and $D_{2w}$ at the terminals $D_{2u}$, $D_{2v}$ and $D_{2w}$ when connected to the terminal $D_{2n}$ are shown as being in the "ON" state. The horizontal axis of the graph is a time axis with periodically repeating first to sixth phase states ① to ⑥ illustrated therealong. For purposes of convenience, it is assumed that the phase is 0° (or 360°) when the potential $V_u$ which is varying from a potential lower than the reference potential $V_{ref0}$ to a potential higher than the reference potential $V_{ref0}$ reaches the reference potential $V_{ref0}$, and the phases of –30° (or 33020 ) to 30°, 30° to 90°, 90° to 150°, 150° to 210°, 210° to 270°, and 270° to 330° are referred to as the first to sixth phase states ① to ⑥, respectively. In the graph of FIG. 5, vertical broken lines spaced at 30° phase intervals are added for the left-handed cycle of the first to sixth phase states ① to ⑥.

The terminal $D_{1u}$ is connected to the terminal $D_{1n}$ in the fifth and sixth phase states. The terminal $D_{1v}$ is connected to the terminal $D_{1n}$ in the first and second phase states. The terminal $D_{1w}$ is connected to the terminal $D_{1n}$ in the third and fourth phase states. The terminal $D_{2u}$ is connected to the terminal $D_{2n}$ in the second and third phase states. The terminal $D_{2v}$ is connected to the terminal $D_{2n}$ in the fourth and fifth phase states. The terminal $D_{2w}$ is connected to the terminal $D_{2n}$ in the first and sixth phase states.

Since the switches 107 and 108 operate in the above described manner, the potentials $V_u$, $V_v$ and $V_w$ exhibit generally sinusoidal waveforms which are identical but out of phase with each other by 120°. Around the peaks of the waveforms, that is, during the time the phase is 120°, the three-phase output circuit 202 supplies or draws current, and these potentials $V_u$, $V_v$ and $V_w$ accordingly have large amplitudes. However, since the neutral point feedback circuit 201 and the three-phase output circuit 202 perform the feedback control, the neutral point potential $V_C$ equals the reference potential $V_{ref0}$. The reference potential $V_{ref0}$ may be set to other than $V_p/2$ unless the potentials $V_u$, $V_v$ and $V_w$ are saturated.

Figure 6:
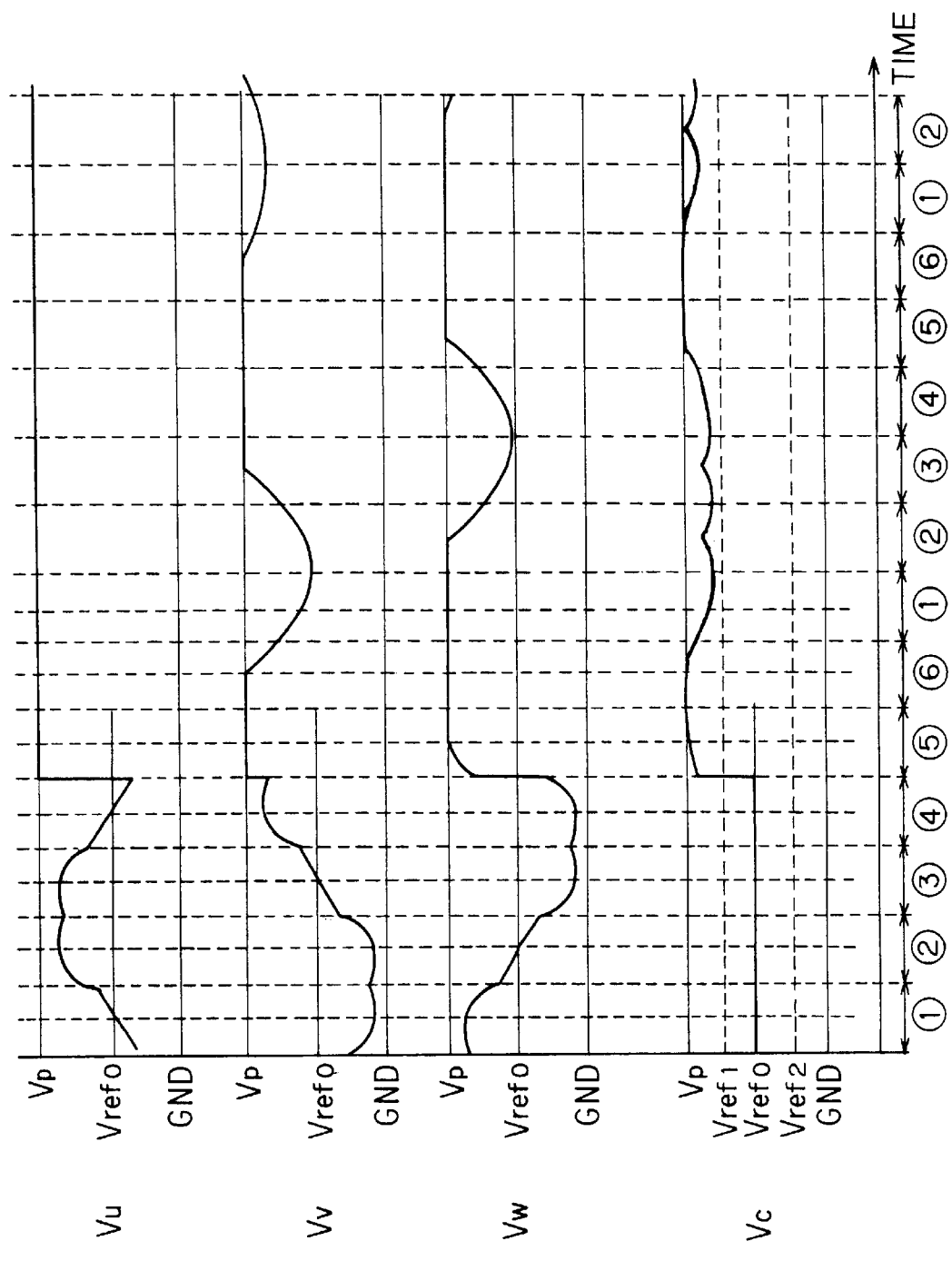

FIG. 6 is a graph showing the transitions of the potentials $V_u$, $V_v$ and $V_w$ and the neutral point potential $V_C$ when a short circuit to the power supply potential $V_p$ occurs in the U-phase exciting coil of the three-phase brushless DC motor 301, specifically when the power supply potential $V_p$ is forcedly supplied to the terminal $T_u$. The short-circuit trouble is shown as caused at a phase of 210° (at the boundary between the fourth and fifth phase states). The potential $V_u$ remains at the power supply potential $V_p$ unless the trouble is recovered. Accordingly, the neutral point potential $V_C$ rises instantaneously. Therefore, if the reference potential $V_{ref1}$ is set to a level higher than the reference potential $V_{ref0}$, the switch shutoff signal SC is activated to cause the switch 106 to stop the supply of the current $I_C$. Then, neither the supply of the current $I_A$ nor the draw of the current $I_B$ is performed, and the three-phase output circuit 202 is prevented from being broken down.

It is not desirable to set the reference potential $V_{ref1}$ at too high a level, for example, at a level equal to the power supply potential $V_p$. The three-phase brushless DC motor 301 rotates through inertia without the supply of the current $I_A$ from the three-phase output circuit 202 or the draw of the current $I_B$ thereto. Based on the rotation, the potentials $V_v$ and $V_w$ vary from the power supply potential $V_p$ so as to generate sinusoidal waves expressed by $\sin(\theta-120°)$ and $\sin(\theta-240°)$, respectively, where $\theta$ is a phase (although the amplitudes of the sinusoidal waves gradually decrease because of energy losses). Then, the potential $V_w$ does not reach the power supply potential $V_p$ after the occurrence of the trouble, that is, during the time period the phase is 30°. On the other hand, the three-phase output circuit 202 supplies current from the power supply potential $V_p$ through the transistors, the potential $V_v$ does not exceed the power supply potential $V_p$ but reaches the power supply potential $V_p$ in the fifth phase state. For detection of an anomaly in the neutral point potential $V_C=(V_p+V_p+V_w)/3<V_p$, the reference potential $V_{ref1}$ must be set at a level lower than the power supply potential $V_p$. Furthermore, the reference potential $V_{ref1}$ is required to satisfy given conditions since the potential $V_v$ thereafter decreases by a large amount on the boundary between the first and second phase states.

It will be found from FIG. 5 that the amplitudes of the potentials $V_u$, $V_v$ and $V_w$ do not exceed $V_p/2$ when the three-phase brushless DC motor 301 is excited by the three-phase output circuit 202. Therefore, the amplitudes of the potentials $V_u$, $V_v$ and $V_w$ generated by the rotation of the three-phase brushless DC motor 301 also do not exceed $V_p/2$. The neutral point potential $V_C$ decreases to the lowest level after the trouble shown in FIG. 6 on the boundary between the first and second phase states (the phase $\theta=30°$), on the boundary between the second and third phase states (the phase $\theta=90°$) and on the boundary between the third and fourth phase states (the phase $\theta=150°$).

When the phase is 30°, the potential $V_v$ does not decrease to a level lower than $(V_p+(V_p/2)\cdot\sin(30°-120°)/2)=V_p/2$. On the other hand, the potential $V_w$ is saturated to reach the power supply potential $V_p$. Thus, the neutral point potential $V_C$ is greater than $(V_p+V_p+V_p/2)/3=5\ V_p/6$. When the phase is 150°, the potential $V_w$ does not decrease to a level lower than $(V_p+(V_p/2)\cdot\sin(150°-240°))=V_p/2$. On the other hand, the potential $V_v$ is saturated to reach the power supply potential $V_p$. Thus, the neutral point potential $V_C$ is greater than $5\ V_p/6$. Further, when the phase is 90°, the potential $V_v$ does not decrease to a level lower than $(V_p+(V_p/2)\cdot\sin(90°-120°))=3\ V_p/4$. When the phase is 90°, the potential $V_w$ does not decrease to a level lower than $(V_p+(V_p/2)\cdot\sin(90°-240°))=3\ V_p/4$. Thus, the neutral point potential $V_C$ is greater than $(V_p+3\ V_p/4+3\ V_p/4)/3=5\ V_p/6$. Consequently, the reference potential $V_{ref1}$ should be set at a level higher than the reference potential $V_{ref0}$ and lower than $5\ V_p/6$.

Figure 7:
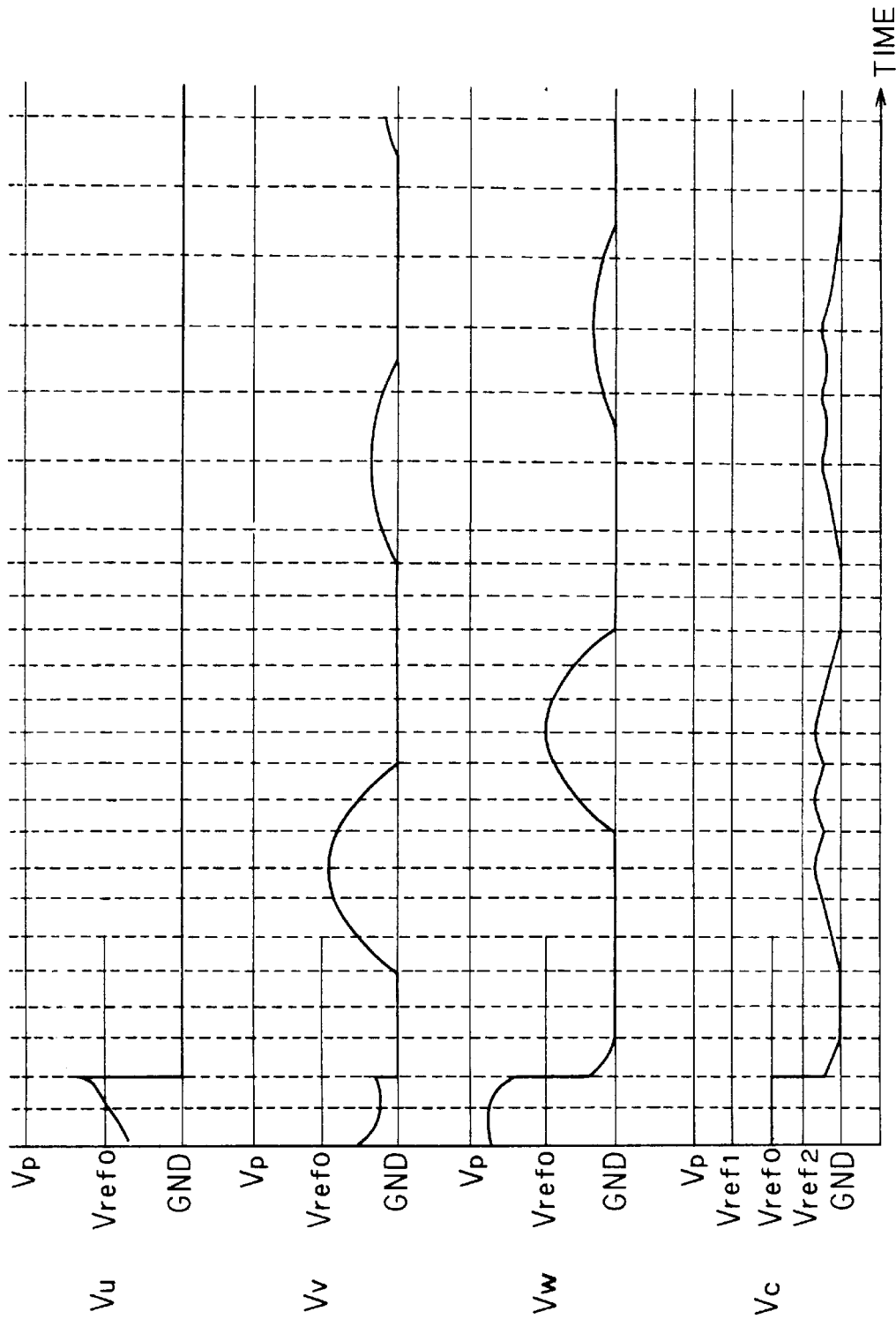

FIG. 7 is a graph showing the transitions of the potentials $V_u$, $V_v$ and $V_w$ and the neutral point potential $V_C$ when a short circuit to the ground potential GND occurs in the U-phase exciting coil of the three-phase brushless DC motor 301, specifically when the terminal $T_u$ is forcedly grounded. The short-circuit trouble is shown as caused at a phase of 30° (at the boundary between the first and second phase states). The potential $V_u$ remains at the ground potential GND unless the trouble is recovered. Accordingly, the neutral point potential $V_C$ falls instantaneously. Therefore, if the reference potential $V_{ref2}$ is set to a level lower than the reference potential $V_{ref0}$, the switch shutoff signal SC is activated to cause the switch 106 to stop the supply of the current $I_C$. Then, neither the supply of the current $I_A$ nor the draw of the current $I_B$ is performed, and the three-phase output circuit 202 is prevented from being broken down.

It is not desirable to set the reference potential $V_{ref2}$ at too low a level, for example, at a level equal to the ground potential GND. The reason therefor is similar to the requirement of the given conditions for the reference potential $V_{ref1}$. Consequently, the reference potential $V_{ref2}$ should be set at a level lower than the reference potential $V_{ref0}$ and higher than $V_p/6$.

Since the switch 106 is off if the neutral point potential $V_C$ is not between the reference potentials $V_{ref1}$ and $V_{ref2}$, the present invention is capable of handling the troubles such as a short circuit to the power supply potential and a short circuit to the ground potential for not only one phase. In the case of a phase-to-phase short circuit, for example, a short circuit between the terminals $T_u$ and $T_v$, the three-phase output circuit 202 does not drive the current when the neutral point potential $V_C$ is higher than the reference potential $V_{ref1}$ or lower than the reference potential $V_{ref2}$. Therefore, the breakdown of the three-phase output circuit is prevented.

C. Second Preferred Embodiment

Figure 8:
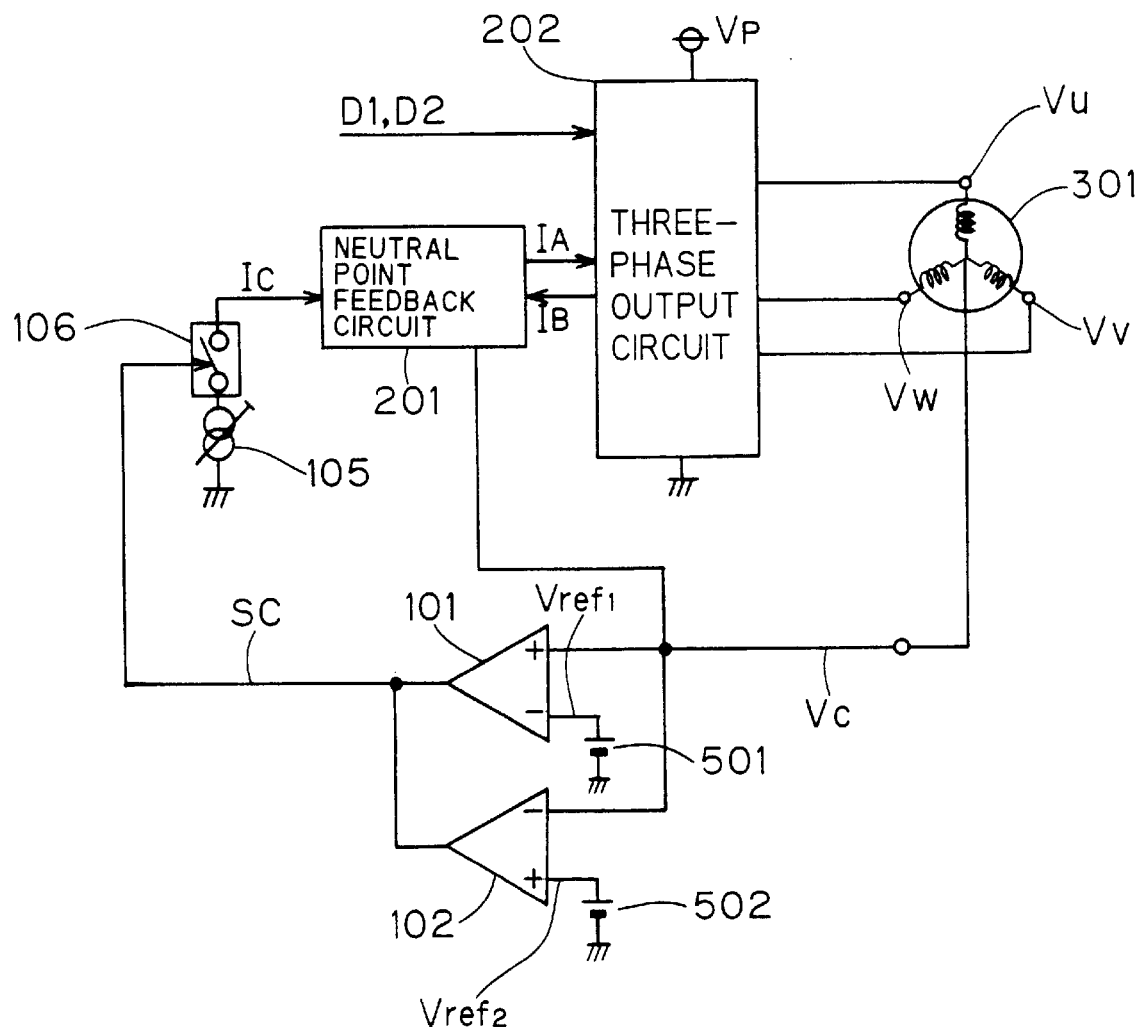
FIG. 8 is a circuit diagram of a second preferred embodiment of the present invention.

FIG. 8 is a circuit diagram of a second preferred embodiment according to the present invention. The second preferred embodiment differs from the first preferred embodiment in that the resistors 1, 2 and 3 used in the first preferred embodiment are eliminated and the neutral point potential $V_C$ is directly drawn from the three-phase brushless DC motor 301.

The second preferred embodiment is similar in operation to the first preferred embodiment. The second preferred embodiment has an advantage over the first preferred embodiment in requiring no resistors. On the other hand, the first preferred embodiment has an advantage over the second preferred embodiment in eliminating the need for an interconnect line for drawing the neutral point potential $V_C$, which interconnect line typically is not provided in the three-phase brushless DC motor 301.

D. Third Preferred Embodiment

Figure 9:
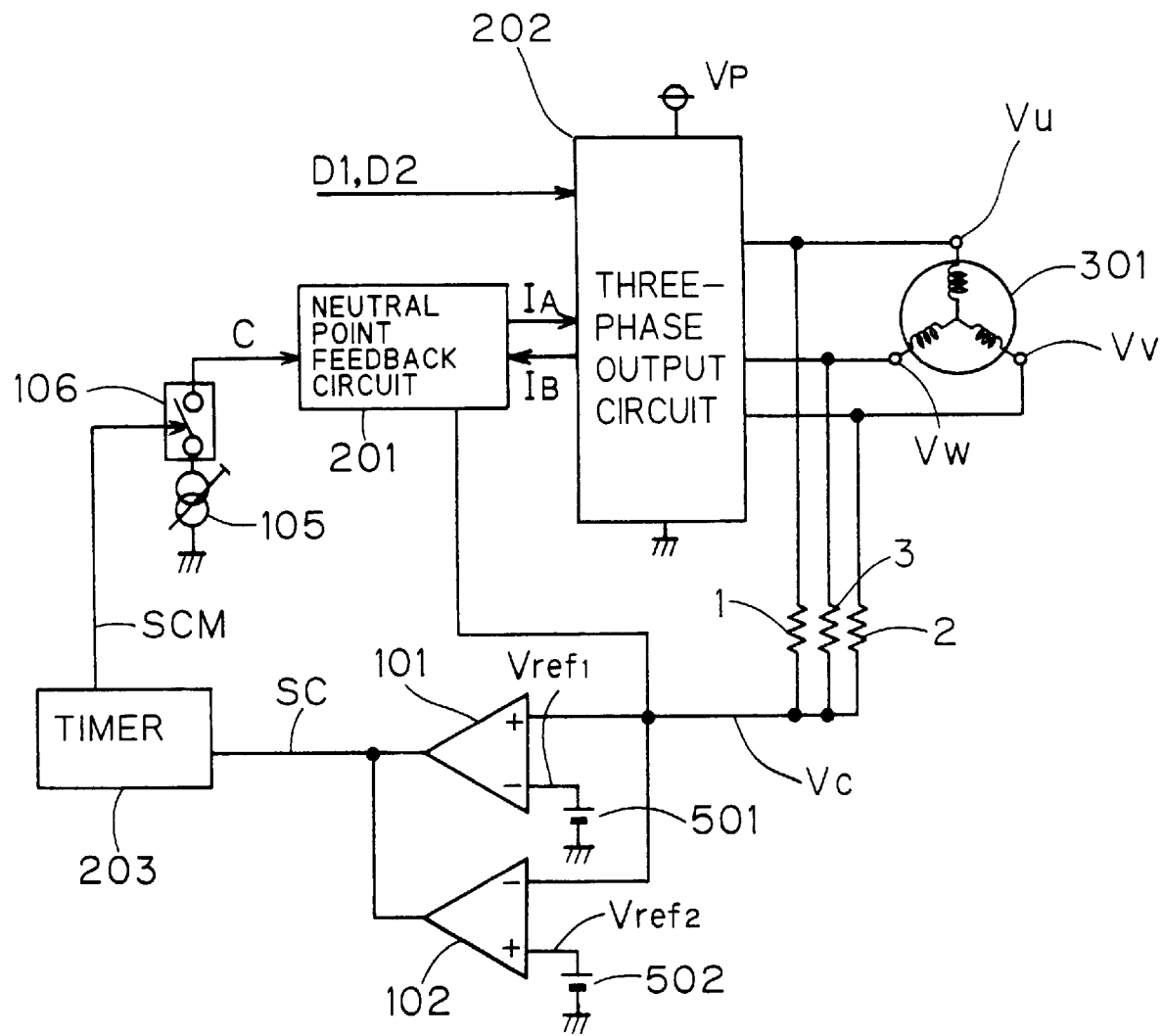
FIG. 9 is a circuit diagram of a third preferred embodiment of the present invention.

FIG. 9 is a circuit diagram of a third preferred embodiment according to the present invention. The third preferred embodiment differs from the first preferred embodiment in that it further comprises a timer 203 in addition to the arrangement of the first preferred embodiment shown in FIG. 1. The timer 203 receives the switch shutoff signal SC to output a modified switch shutoff signal SCM. The switch 106 is turned off in response to the activation of the modified switch shutoff signal SCM, not in response to the activation of the switch shutoff signal SC.

The timer 203 invalidates (masks) the activation of the switch shutoff signal SC for a predetermined time period after power is turned on. Specifically, after power is turned on, the modified switch shutoff signal SCM is not active if the switch shutoff signal SC is activated during the predetermine time period. After an elapse of the predetermined time period, the modified switch shutoff signal SCM is activated based on the activation of the switch shutoff signal SC.

The necessity to invalidate the switch shutoff signal SC for the predetermined time period will be described below. FIG. 10 is a graph showing variations in the potentials $V_u$, $V_v$ and $V_w$ with time after power is turned on. A given time period is required for the power supply potential $V_p$ to reach a predetermined potential (for example, $V_{cc}$, which represents the power supply potential $V_p$ described in the first and second preferred embodiments) after power is turned on. After the power supply potential $V_p$ reaches the predetermined potential, the potentials $V_u$, $V_v$ and $V_w$ monotonically increase as the three-phase brushless DC motor 301 starts rotating, and the neutral point potential $V_C$ sometimes also monotonically increases. In such a case, the neutral point potential $V_C$ is lower than the reference potential $V_{ref2}$ although the neutral point feedback circuit 201 performs the control as the three-phase brushless DC motor 301 starts rotating.

The use of the techniques of the first and second preferred embodiments causes the comparator 102 to output "H" under such conditions to turn off the switch 106, resulting in non-rotation of the three-phase brushless DC motor 301 in some cases.

To avoid such a situation, the timer 203 validates the switch shutoff signal SC after an elapse of the time period for which the three-phase brushless DC motor 301 starts rotating and the neutral point feedback circuit 201 performs the negative feedback operation for the neutral point potential $V_C$.

Figure 11:
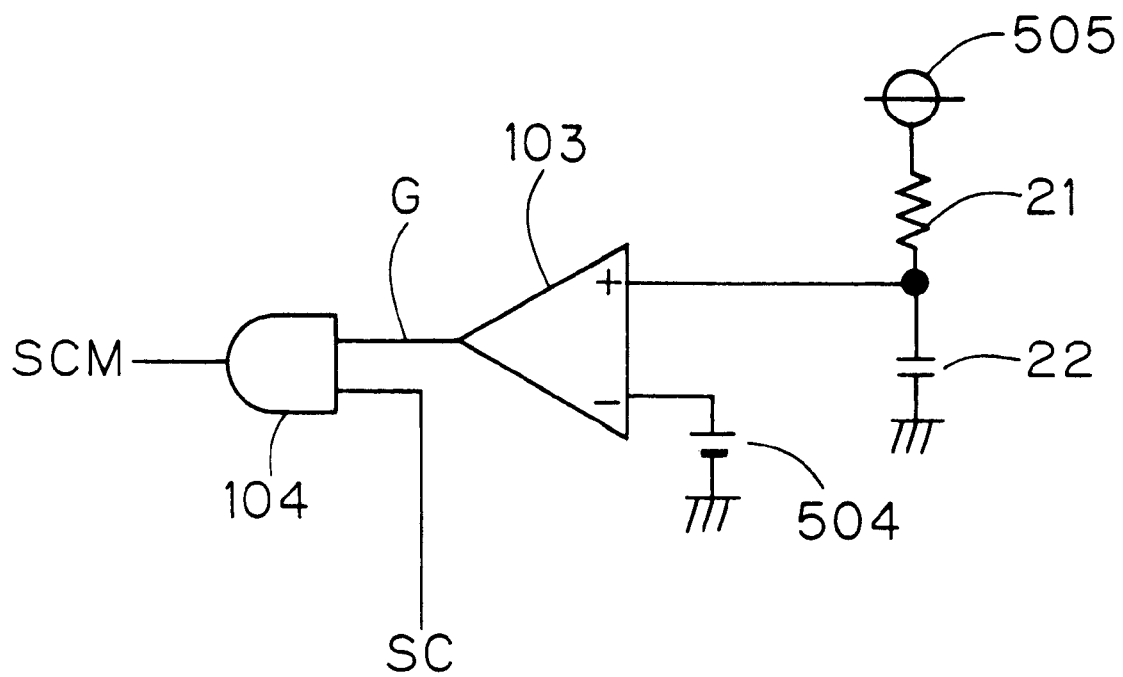
FIG. 11 is a circuit diagram of a timer.

FIG. 11 is a circuit diagram illustrating an arrangement of the timer 203. A comparator 103 has a positive input connected to a power supply 505 through a resistor 21 and grounded through a capacitor 22, a negative input connected to a power supply 504 for supplying a reference potential, and an output for providing a signal G. An AND gate 104 provides the modified switch shutoff signal SCM as the AND of the signal G and the switch shutoff signal SC.

The power supply 505 is not necessarily required to be associated with the power supply potential $V_p$. Only charging the capacitor 22 through the resistor 21 may cause the timer 203 to perform a desired operation. The potential at the positive input of the comparator 103 gradually increases depending on a time constant determined by the values of the resistor 21 and the capacitor 22. The signal G does not make a low to high transition until the gradually increasing potential at the positive input of the comparator 103 reaches the reference potential provided from the power supply 504. Thus, the AND gate 104 may mask the switch shutoff signal SC while the signal G is low.

Thus, the third preferred embodiment produces the effect of preventing malfunctions when power is turned on as well as producing the effects of preventing the breakdown of the three-phase output circuit 202 like the first preferred embodiment.

While the invention has been described in detail, the foregoing description is in all aspects illustrative and not restrictive. It is understood that numerous other modifications and variations can be devised without departing from the scope of the invention.

I claim:

1. A circuit for driving a polyphase motor, comprising:
    a current source for supplying a first current;
    a switch operative to turn off in response to activation of a switch shutoff signal;
    a neutral point feedback circuit connected to said current source through said switch for performing a feedback operation for generating a second current based on said first current and a neutral point potential of a polyphase motor;
    a polyphase output circuit for supplying current selectively to a plurality of phases of said polyphase motor based on said second current and a first switching signal associated with said phases of said polyphase motor; and
    a neutral point potential comparison circuit for inactivating/activating said switch shutoff signal depending on whether or not said neutral point potential falls within a predetermined range.

2. The circuit according to claim 1,
    wherein said neutral point feedback circuit also generates a third current based on said first current and said neutral point potential, and
    wherein said polyphase output circuit draws current selectively from said phases of said polyphase motor based on said third current and a second switching signal associated with said phases of said polyphase motor.

3. The circuit according to claim 2,
    wherein said neutral point feedback circuit comprises
    a differential amplifier having a first input receiving a neutral point reference potential, a second input receiving said neutral point potential, and a pair of outputs for outputting said second and third currents based on a difference between said neutral point reference potential and said neutral point potential, said differential amplifier being operated based on a current proportional to said first current.

4. The circuit according to claim 3,
    wherein a time period for which said second current is supplied to each of said phases and a time period for which said third current is drawn therefrom are spaced a phase period of 180°/N apart from each other where N is the number of phases of said polyphase motor.

5. The circuit according to claim 4,
    wherein said number of phases N equals 3.

6. The circuit according to claim 5,
    wherein said neutral point feedback circuit operates using a first potential and a second potential as power supply potentials, and
    wherein said predetermined range has a first limit between said neutral point reference potential and said first potential, and a second limit between said neutral point reference potential and said second potential.

7. The circuit according to claim 6,
    wherein said neutral point comparison circuit comprises:
    a first comparator having a negative input receiving a potential corresponding to said first limit, a positive input receiving said neutral point potential, and an output; and
    a second comparator having a positive input receiving a potential corresponding to said second limit, a negative input receiving said neutral point potential, and an output connected to said output of said first comparator,
    said switch shutoff signal being provided from said outputs of said first and second comparators.

8. The circuit according to claim 6,
    wherein said neutral point reference potential is set at the average of said first potential and said second potential.

9. The circuit according to claim 8,
    wherein said first limit is set to a level shifted from said first potential toward said second potential by not less than ⅙ of a difference between said first potential and said second potential.

10. The circuit according to claim 9,
    wherein said second limit is set to a level shifted from said second potential toward said first potential by not less than ⅙ of a difference between said first potential and said second potential.

11. The circuit according to claim 1,
    wherein said polyphase motor includes outputs for said phases, respectively,
    said circuit further comprising:
    a plurality of resistors provided in corresponding relation to said outputs, and having first ends connected respectively to said outputs and second ends connected commonly,
    said neutral point potential being provided from said second ends of said plurality of resistors.

12. The circuit according to claim 1, further comprising:
    a masking circuit for invalidating said switch shutoff signal in an early stage of rotation of said polyphase motor.

13. The circuit according to claim 12,
    wherein said masking circuit renders said switch shutoff signal valid after said neutral point feedback circuit starts said feedback operation.

14. The circuit according to claim 13,
    wherein said masking circuit includes a gate operative to open after an elapse of predetermined time, and
    wherein said switch shutoff signal is applied through said gate to said switch.

15. The circuit according to claim 11, further comprising:
    a masking circuit for invalidating said switch shutoff signal in an early stage of rotation of said polyphase motor.

16. The circuit according to claim 15,
    wherein said masking circuit renders said switch shutoff signal valid after said neutral point feedback circuit starts said feedback operation.

17. The circuit according to claim 16,
    wherein said masking circuit includes a gate operative to open after an elapse of predetermined time, and
    wherein said switch shutoff signal is applied through said gate to said switch.

* * * * *